Patented Nov. 16, 1937

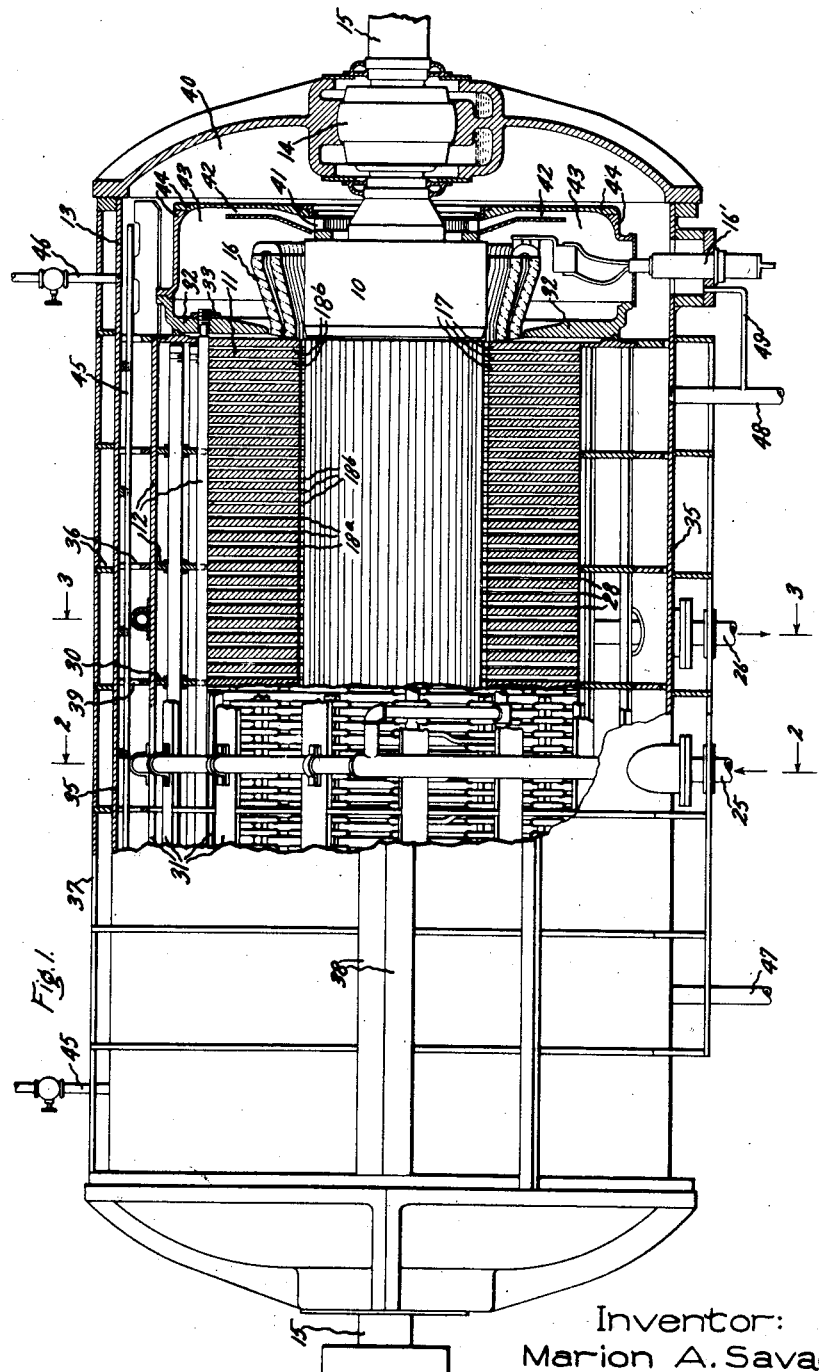

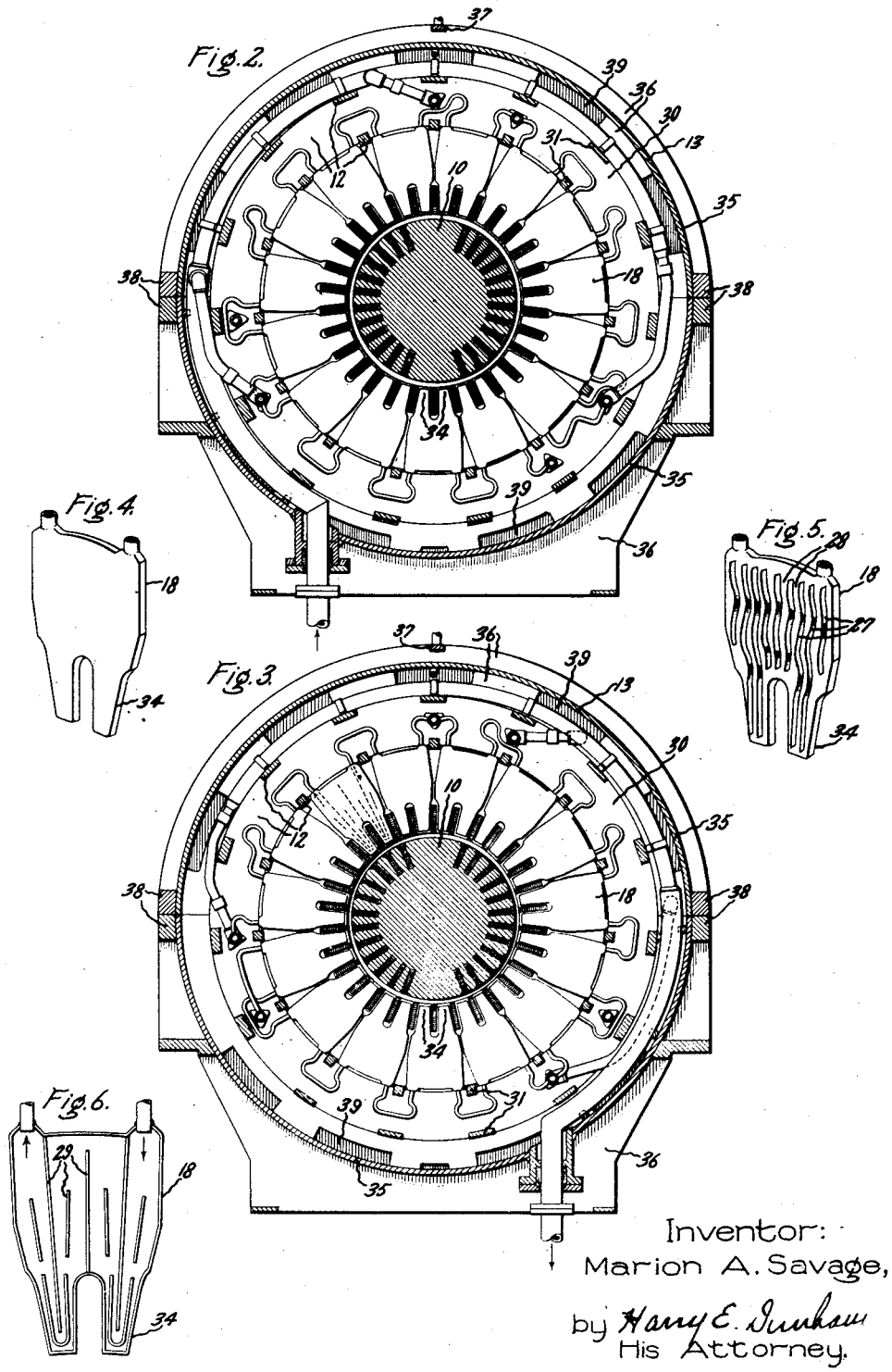

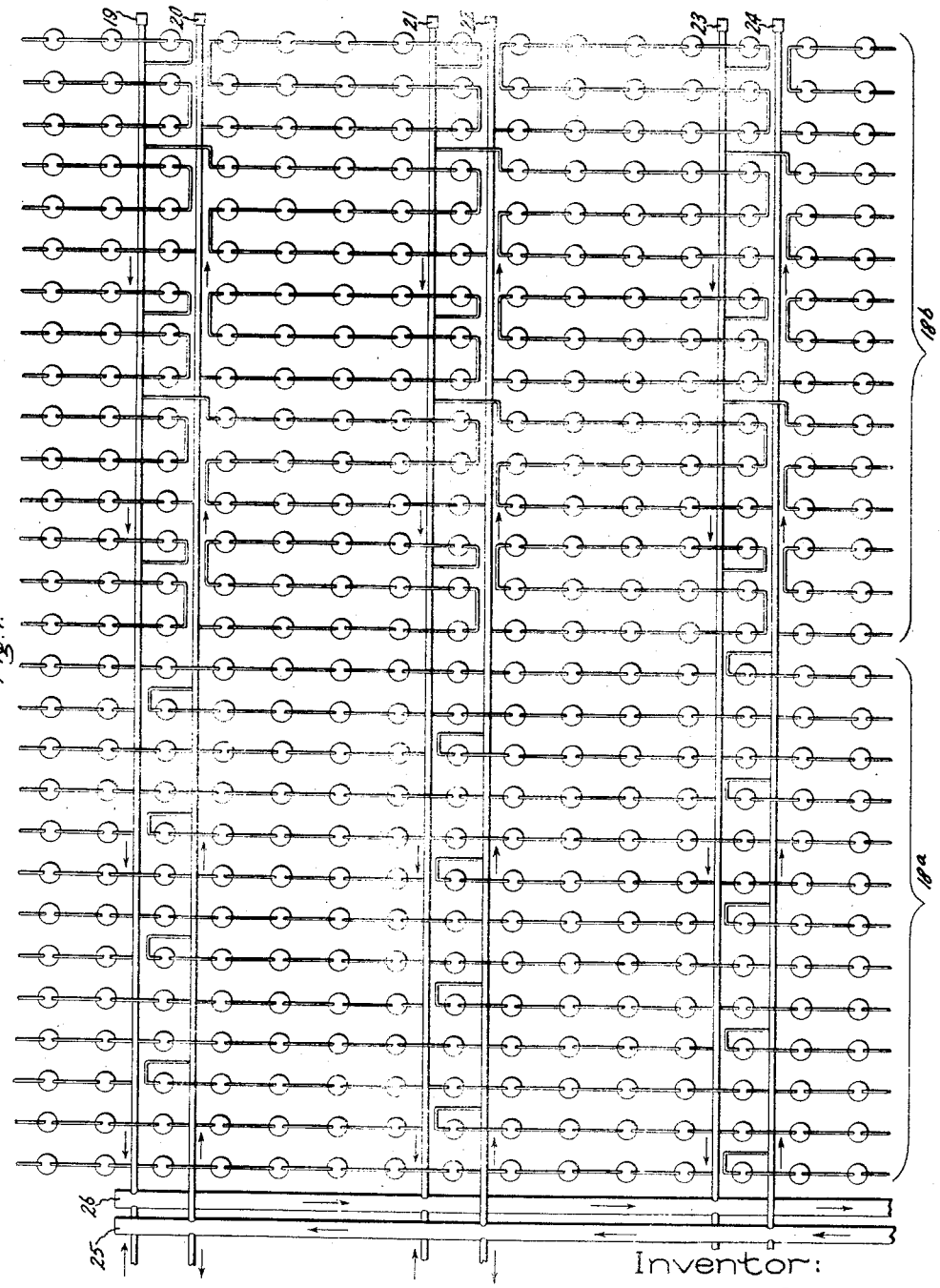

2,099,575

UNITED STATES PATENT OFFICE 2,099,575

DYNAMO-ELECTRIC MACHINE

Marion A. Savage, Scotia, N. Y., assignor to General Electric Company, a corporation of New York Application June 24, 1936, Serial No. 86,964

13 Claims. (Cl. 172—252)

My invention relates to dynamo-electric machines.

It is an object of my invention to provide an improved cooling system for removing the heat generated in a dynamo-electric machine due to the iron and copper losses therein.

It is a further object of my invention to provide a cooling system in which the heat generated in the stationary member of a dynamo-electric machine is removed therefrom by conduction through the agency of cooling pads located in this structure, and in which the heat generated in the rotatable member and the end turns of the winding in the stationary member is removed by convection through the agency of a cooling gas circulated along the rotatable member through passageways in the central portion of the stationary member adjacent or next to the cooling pads located therein and over the end turns of the winding located in the stationary member.

It is another object of my invention to provide a cooling system admirably suited for high speed turbo-generators which not only substantially reduces the lengths of such machines, but also greatly reduces the space required in power stations for such machines and their cooling equipment.

It is also an object of my invention to provide a cooling system for totally enclosed machines in which the amount of cooling gas employed is greatly reduced.

Further objects of my invention will become apparent from the following description of one embodiment thereof which has been illustrated in the accompanying drawings.

In these drawings, Fig. 1 is a side view of a turbo-generator with parts broken away and in section to show the interior construction thereof; Figs. 2 and 3 are sections of the machine shown in Fig. 1 taken respectively along the lines 2—2 and 3—3 of that figure; Figs. 4 and 5 are perspective views of the cooling pads forming part of the structure of the dynamo-electric machine of Figs. 1, 2 and 3; Fig. 6 is a sectional view showing the interior construction of the cooling pads shown in Figs. 4 and 5; and Fig. 7 is a diagrammatic development showing the arrangement and connection of the cooling pads in the right half portion of the core structure of the dynamo-electric machine of Fig. 1.

In the drawings, a rotatable member 10 of the dynamo-electric machine is surrounded by a stationary member or core structure 11 which is supported in a frame 12. This frame in turn is supported within a housing 13, the end portions of which contain bearings 14 in which the shaft 15 of the rotatable member 10 is supported. As shown in Fig. 1, the shaft 15 is connected to the turbine shaft at the left of the machine, and may be connected to an exciter at the right of the machine.

The field exciting winding of the machine is located in slots in its rotatable member 10, and its armature winding 16 is located in slots distributed about the inner periphery of the core structure 11 forming part of the stationary member of the machine. Connections with the field exciting winding are made through conductors (not shown) which extend through the shaft 15 at the right of the rotatable member 10. The armature winding 16 is provided with terminals 16' which extend through the lower right end of the housing 13.

The core structure 11 comprises a plurality of sections formed of bundles of laminations 17 arranged throughout the length of the core and separated by cooling pads 18. Each of these cooling pads is in heat conducting engagement at its sides with the aforesaid bundles of laminations. The cooling pads 18a throughout the central portion of the stationary member are spaced by ribs from the sections of the core structure between which they are located to form passageways in its side walls, and the pads 18b throughout the end portion of said stationary member closely abut the sections of the core structure between which they are located to form an imperforate wall structure at the ends of the core structure 11.

The cooling pads are connected in series with one another to form groups through which a cooling fluid is circulated, the arrangement of the cooling pads relative to one another and the direction of flow of cooling fluid through these pads being so correlated as to produce a substantially uniform cooling effect in the core structure 11 of the machine. One manner of connecting these cooling pads for the attainment of this result is shown in Fig. 7, illustrating the arrangement of the pads in the right hand half of Fig. 1. As shown in this figure, cooling fluid is supplied to the pad groups through longitudinally extending headers 19, 20, 21, 22, 23 and 24, which are connected to circumferential headers 25 and 26 located at the center of the machine. Headers 25 and 26 extend through the housing of the machine to a source of cooling fluid. In the first thirteen circumferential groupings on each side of the center line of the machine the pads are connected in groups of four, five and six between the headers 19 to 24, as shown in Fig. 7. The arrows associated with the headers in this figure represent the direction of flow of cooling fluid therein, which determines the directions of flow of the cooling fluid in the groups of pads connected between these headers. In the fifteen circumferential groupings of cooling pads at each end of the machine, the cooling pads are connected in groups of fifteen, as shown in Fig. 7. The thirteen circumferential groupings of cooling pads on each side of the center line of the machine serve not only to remove heat from the core structure in which they are inserted, but also to remove heat from the cooling gas which is circulated through passageways adjacent these pads and which has become heated by its passage over the end turns of the winding in this core structure and over the rotatable member of the machine, while the fifteen circumferential groupings of cooling pads at each end of the machine serve only to remove heat from the core structure in which they are located. Consequently, groupings four, five, and six of the pads 18a are used in the central portion of the machine where the heat taken up by each pad is greater than in the ends of the machine where groupings of fifteen of the pads 18b may be employed. The particular grouping of Fig. 7 is one of several groupings that can be employed for obtaining a substantially uniform cooling effect in the stationary core structure of the machine. The grouping and arrangement will, of course, depend in large measure on the number and size of pads employed.

The cooling pads 18 in the central portion of the stationary core member are of the construction illustrated in Figs. 4 and 5. One side of these pads is provided with ribs 27 which space the pads from the bundle of laminations adjacent this side of the pad and form, between the bundle of laminations and the pad, passageways 28 extending through the side walls of the core structure 11. The cooling pads 18 in the end portions of the stationary member are not provided with ribs and are consequently in direct contact with the bundles of laminations on each side of them, thus forming an imperforate wall structure in the ends of the core structure 11. The interior of the pads, as shown in Fig. 6, are provided with a plurality of baffles 29 which not only serve to direct the cooling fluid in its passage through the cooling pad, but also serve as reinforcing ribs which enable these pads to withstand the clamping pressure exerted on them and the bundles of laminations between them when held and clamped in the frame 12 of the machine.

The cooling pads may have the structure particularly described and claimed in my application, Serial No. 86,966 for Cooling pad, filed concurrently herewith and assigned to the assignee of this invention. They are preferably made of a thin nonmagnetic material having a high electrical resistance. This will decrease the heat generated in them by hysteresis and eddy current losses. I prefer to use Monel metal which is a copper-nickel alloy, although stainless steels could be used. The inlet and outlet connections to these pads may be made by silver soldering or in some other manner that will enable them to be separated and removed from the group in which they are connected if repairs become necessary. Electrolytic corrosion may be avoided by selecting materials for the fluid conduit system which have a low potential difference with regard to the metal of the pads. Distilled water is preferred as the cooling fluid.

The frame 12 of the machine is formed of a plurality of longitudinally spaced annular members 30 connected together by circumferentially spaced longitudinally extending tie members 31 attached to the inner and outer peripheries of the annular members 30. This arrangement forms a squirrel-cage structure having openings in its side wall opposite which the cooling pads in the core structure 11 are located. These cooling pads are positioned in the core structure of the machine in sectors defined by the tie members 31 of the frame and are dimensioned to pass between the members of the frame and to and from the winding 16 in the core structure without interfering with the frame or this winding. The ends of some of the tie members extend beyond the core structure and constitute bolts by means of which clamping rings 32 are held against the ends of the core structure by nuts 33.

With the construction above described, it is apparent that by releasing the clamping rings 32, the cooling pads may be removed from and replaced in the core structure by pushing them from or to their position between bundles of laminations through the openings in the frame within which the core structure is located, and that this can be done without removing the laminations from the frame. Furthermore, by properly proportioning the projecting end portions 34 of the cooling pads 18 which extend between the winding 16, it is possible to move these pads along a radius extending through their center without having the projecting portions of the pad interfere with the winding. This makes it unnecessary to remove the winding 16 from the core structure 11.

The housing 13 which encloses and supports the stationary and rotatable members of the dynamo-electric machine comprises an upper and lower shell and upper and lower end portions which are connected together to form the housing. The upper and lower shells comprise sheets 35 reinforced on their inner and outer surfaces by ribs 36. The reinforcing ribs on the bottom of the lower shell are shaped to form a supporting base structure for the machine as a whole. The frame 12 rests on the ribs on the lower shell of housing 13. Straps 37 between the outer ribs 36 at the top of the housing and flanges 38 of the upper and lower shells together with the edge portions of longitudinally extending strips forming part of the supporting base furnish support for a lagging or covering applied to the housing to give it a finished, smooth surface. The frame 12 and the several portions of the housing 13 are fabricated by welding the various members thereof into an integral structure. The top and bottom shells and the top and end portions of the housing are secured together by bolting, so that the housing may be opened and the core structure 11 and frame 12 lifted therefrom as a unit. Before doing this it is necessary, however, to disconnect portions of the circumferential headers 25 and 26, parts of which are attached to the lower shell of the housing and parts of which are attached to the frame 12.

The inner ribs 36 of the upper and lower shells of the housing are provided with openings 39, which form passageways extending lengthwise of the housing and connect the passageways 28 in the central portion of the stationary member 11 with chambers 40 in the ends of the housing.

Fans 41 mounted on the ends of the rotatable member 10 force the cooling gas within the housing through diffusers 42 into pressure chambers 43 defined by casings 44 and clamping rings 32. From these chambers 43 the cooling gas flows over the end turns of winding 16, along the rotatable member 10 in the gap between this member and the core structure 11 and then through the passageways 28 to the passageways 39 extending along the housing 13 to the ends of the housing and to fans 41.

In accordance with my invention I use hydrogen as the cooling gas in order to reduce "windage" losses and also to reduce the volume of gas employed. Furthermore, by using hydrogen the gas may be circulated at greater velocities and, consequently, smaller fans may be used for this purpose.

Pipes 45, 46, 47, 48, and 49 are provided for introducing hydrogen into the machine. The usual procedure is to supply carbon dioxide through pipes 47, 48 and 49 to force the air from the housing through pipe 46. Pipe 46 is then closed and hydrogen is supplied through pipe 45 while the carbon dioxide is drained from the casing through pipes 47, 48, and 49. After the housing has been completely filled with hydrogen, pipes 47, 48, and 49 are closed and the supply of hydrogen is cut off from pipe 45. Suitable seals are provided at the bearings 14 through which the spindles 15 extend. Means are also provided for circulating oil through these bearings and for removing from this oil the hydrogen entrained at the bearings and seals. This hydrogen is returned to the housing together with a sufficient quantity of hydrogen to maintain a desired pressure in the housing of the machine. This pressure is usually greater than atmospheric so that leakage will be from the interior of the machine to its exterior. If leakage occurred in the reverse direction the oxygen of the air may form an explosive gas mixture in the housing of the machine.

The cooling pads remove by conduction the heat losses in the core structure 11 of the machine. The cooling pads in the central portion of the stationary member also serve to cool the cooling gas, which, in turn, by conduction and convection removes the heat losses in the rotatable member 10 and in the end turns of the winding 16 in core structure 11. The construction employed makes it possible to remove about 60% of the heat losses of the machine by conduction and the remaining 40% by convection. This reduces the volume of cooling gas, and this in turn greatly reduces the size of the machine. The most important reduction in size occurs in the length of the machine by reason of the smaller space requirements at the ends of the machine for the circulation of the cooling gas. This makes it possible to have a rotatable member of smaller length relative to its diameter and consequently of greater stiffness which in turn increases the critical speeds of the rotatable member and renders a machine embodying my construction admirably suited for high speed turbo-alternators. By high speed, I mean speeds of 3000 or more revolutions per minute. A particularly desirable operating speed for 60 cycle machines is 3600 revolutions per minute.

My invention is of particular utility when hydrogen is used as the cooling gas. Hydrogen at high pressures greatly increases the output and efficiency of a machine without increasing its windage losses. In fact the windage losses in hydrogen at several atmospheres pressure is less than in air at atmospheric pressure. By using the cooling system of my invention, much less hydrogen is employed for charging the machine and the cooling system and machine members may be enclosed in a cylindrical boiler-like housing which is suited for containing hydrogen or similar gas at many atmospheres pressure.

Although my invention is particularly applicable to high speed hydrogen cooled machines of the construction above specifically described, it is, of course, apparent that most of the features thereof are generally applicable for the cooling of dynamo-electric machines of the enclosed type in which the cooling gas is repeatedly circulated in a closed path or closed paths within the machine. The direction or directions in which the cooling gas is circulated may be reversed from that described above without in any way departing from my invention. The piping for the cooling system may also be arranged in any suitable manner, depending upon the construction of the machine. It is also apparent that the cooling pads, instead of forming a portion of the wall structure of the passageways in the central part of the core structure of the machine, may be located in the core structure adjacent passageways formed therein.

I do not, therefore, wish my invention to be limited to the particular construction disclosed, but intend in the appended claims to cover all modifications, which do not depart from the spirit and scope of my invention.

What I claim as new and desire to secure by Letters Patent of the United States is:

1. A dynamo-electric machine comprising a rotatable member, a stationary member surrounding said rotatable member, cooling pads between and in heat conductive engagement with longitudinally spaced sections of said stationary member, said pads in the central portion of said stationary member being spaced from said sections to form passageways in the side walls of said stationary member and said pads in the ends of said stationary member co-operating with said sections to form imperforate side walls at the ends of said stationary member, means for circulating a cooling fluid through said pads, and means for circulating a cooling gas along said rotatable member and through said passageways in the central portion of said stationary member.

2. A dynamo-electric machine comprising a rotatable member, a stationary member surrounding said rotatable member and having end portions with imperforate side walls and a central portion having radial passageways in its side walls, cooling pads located between and in heat conductive engagement with longitudinally spaced sections of the end portions of said stationary member, cooling pads adjacent said radial passageways in the central portion of said stationary member and in heat conductive engagement with longitudinally spaced sections of the central portion of said stationary member, means for circulating a cooling fluid through said pads, and means for circulating a cooling gas between said stationary and said rotatable members and through said radial passageways in the central portion of said stationary member.

3. A dynamo-electric machine comprising a rotatable member, a stationary member surrounding said rotatable member and having end portions with imperforate side walls and a central portion with radial passageways in its side walls, cooling pads between and in heat conductive engagement with longitudinally spaced sections of said stationary member and forming in the central portion thereof at least a portion of the wall structure of said radial passageways, means for circulating a cooling fluid through said pads, a winding in said stationary member, and means for circulating a cooling gas through said passageways and along said rotatable member.

4. A dynamo-electric machine comprising a rotatable member, a stationary member surrounding said rotatable member and having end portions with imperforate side walls and a central portion provided with radial passageways in its side walls, cooling pads between and in heat conductive engagement with longitudinally spaced sections of said stationary member and forming in the central portion thereof at least a portion of the wall structure of said radial passageways, means for circulating a cooling fluid through said cooling pads, a winding in said stationary member having end portions extending beyond the ends of said stationary member, a housing spaced from and enclosing said stationary and rotatable members, and means within said housing for circulating a cooling gas along said rotatable member through said passageways in the central portion of said stationary member and over the end portions of the winding in said stationary member.

5. A dynamo-electric machine comprising a rotatable member, a stationary member surrounding said rotatable member and having end portions with imperforate side walls and a central portion provided with radial passageways in its side walls, cooling pads between and in heat conductive engagement with longitudinally spaced sections of said stationary member and forming in the central portion thereof at least a portion of the wall structure of said radial passageways, means for circulating a cooling fluid through said cooling pads, a winding in said stationary member having end portions extending beyond the ends of said stationary member, a cylindrical boiler-like housing spaced from and enclosing said stationary and rotatable members, and means within said housing for circulating a cooling gas along said rotatable member through said passageways in the central portion of said stationary member and over the end portions of the winding in said stationary member.

6. A dynamo-electric machine comprising a core structure, a winding in said core structure, cooling pads between and in heat conductive engagement with longitudinally spaced sections of said core structure, means for connecting groups of said pads in series with one another, and means for circulating cooling fluid through each of said groups, the arrangement of said pads relative to one another and the direction of flow of cooling fluid through said pads being correlated to produce a substantially uniform cooling effect in said core structure.

7. A dynamo-electric machine comprising a core structure of bundles of laminations separated by cooling pads in heat conductive engagement therewith, a frame in which said core structure is supported with said pads opposite openings in said frame through which said pads will pass, means for connecting groups of said pads in series with one another, and means for circulating a cooling fluid through each of said groups of pads, the arrangement of said cooling pads relative to one another and the direction of flow of cooling fluid through said pads being correlated to produce a substantially uniform cooling effect in said core structure.

8. A dynamo-electric machine comprising a core structure of bundles of laminations separated by cooling pads in heat conductive engagement therewith, means for circulating a cooling fluid through said pads, a winding in said core structure, and means for holding and clamping said laminations and said pads in assembled relationship, said pads having a size and configuration such that by releasing the clamping action of said means they may be removed from and replaced between said bundles of laminations through the side of said means without removing said bundles of laminations from said means or said winding from said laminations.

9. A dynamo-electric machine comprising a core structure, a winding in said core structure, cooling pads between and in heat conductive engagement with longitudinally spaced sections of said core structure, means for circulating a cooling fluid through said cooling pads, and a frame in which said core structure is supported, said frame having side wall openings opposite said pads through which said pads will pass.

10. A dynamo-electric machine comprising a core structure, a winding in said core structure, cooling pads between and in heat conductive engagement with longitudinally spaced sections of said core structure, means for circulating a cooling fluid through said cooling pads, and a frame in which said core structure is supported, said frame having side wall openings opposite said pads through which said pads will pass, and each pad having portions normally located between portions of said winding and movable thereto and therefrom without interfering therewith when said pad is moved through an opening in said frame along a radius extending through the center of said pad.

11. A dynamo-electric machine comprising a frame of longitudinally spaced annular members connected together by circumferentially spaced longitudinally extending tie members attached to the inner and outer peripheries of said annular members, an annular core structure of laminations supported by said frame, a winding in said core structure, circumferential groups of cooling pads of substantially the configuration of said laminations and located between and in heat conductive engagement with longitudinally spaced bundles of said laminations, and means for circulating a cooling fluid through said cooling pads, said cooling pads being located in said core structure in positions offset from the members of said frame and being dimensioned to pass through said frame without interfering with said frame or said winding.

12. A dynamo-electric machine comprising a frame of longitudinally spaced annular members connected together by circumferentially spaced longitudinally extending tie members attached to the inner and outer peripheries of said annular members, an annular core structure of radially disposed laminations slotted at their inner peripheries for a winding and attached at their outer peripheries to the inner tie members of said frame, a winding in said core structure, circumferential groups of cooling pads between and in heat conductive engagement with longitudinally spaced bundles of said laminations, said pads being positioned in sectors of said core structure defined by the tie members of said frame and being dimensioned to pass between the annular and tie members of said frame and to and from the winding of said core structure without interfering with said frame or said winding, and means for circulating a cooling fluid through said pads.

13. A dynamo-electric machine comprising a rotatable member, a frame of longitudinally spaced annular members connected together by circumferentially spaced longitudinally extending tie members attached to the inner and outer peripheries of said annular members, a stationary member supported in said frame and surrounding said rotatable member, a winding in said stationary member having end portions extending beyond the ends of said stationary member, a housing spaced from and enclosing said frame, cooling pads located between and in heat conductive engagement with longitudinally spaced sections of said stationary member in sectors defined by the tie members of said frame and dimensioned to pass between the members of said frame and to and from said winding without interfering with said frame or said winding, said pads in the central portion of said stationary member being spaced from said sections to form passageways in the side walls of said stationary member, and said pads in the ends of said member co-operating with said sections to form imperforate side walls at the ends of said stationary member, means for connecting groups of said pads in series with one another, means for circulating a cooling fluid through each of said groups of pads, the arrangement of said cooling pads relative to one another and to the direction of flow of cooling fluid through said pads being correlated to produce a substantially uniform cooling effect in said stationary member, and means within said housing for circulating a cooling gas between said stationary and rotatable members through said passageways in the central portions of said stationary member and over the end portions of the winding in said stationary member.

MARION A. SAVAGE.